(12) United States Patent
Cermak et al.

(10) Patent No.: US 6,705,948 B2
(45) Date of Patent: Mar. 16, 2004

(54) SETTABLE PLUNGING UNIT

(75) Inventors: Herbert Cermak, Bessenbach (DE); Erik Schamper, Frankfurt am Main (DE); Michael Zierz, Freiensteinau (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 10/140,219

(22) Filed: May 7, 2002

(65) Prior Publication Data
US 2002/0169026 A1 Nov. 14, 2002

(30) Foreign Application Priority Data
May 12, 2001 (DE) .......................... 101 23 221

(51) Int. Cl.⁷ .............................. F16C 3/035; F16D 3/06
(52) U.S. Cl. .......................... 464/167; 464/906; 384/49
(58) Field of Search .................... 464/139, 141, 464/143, 145, 146, 162, 167, 183, 178, 906; 384/49

(56) References Cited

U.S. PATENT DOCUMENTS

| | | | | |
|---|---|---|---|---|
| 3,237,429 A | * | 3/1966 | Biabaud | 464/145 |
| 3,689,124 A | * | 9/1972 | Irwin | 384/43 |
| 3,808,839 A | * | 5/1974 | Teramachi | 464/168 |
| 4,138,167 A | * | 2/1979 | Ernst et al. | 384/43 |
| 6,217,456 B1 | * | 4/2001 | Jacob | 464/167 |

FOREIGN PATENT DOCUMENTS

DE     199 52 245 A1     7/2000

* cited by examiner

*Primary Examiner*—Lynne H. Browne
*Assistant Examiner*—Kenn Thompson

(57) ABSTRACT

An axial plunging unit for transmitting torque within a driveline, includes a profiled sleeve (11) with circumferentially distributed longitudinally extending first ball grooves (12), a profiled journal (13) with circumferentially distributed longitudinally extending second ball grooves (14), and balls (15) which are arranged in pairs of first and second ball grooves (12, 14) in groups (k) of balls, wherein the number of first ball grooves (11) corresponds to m times the number k of the groups of balls and wherein the longitudinal axes of the first, second, etc. to the $m^{th}$ of the first ball grooves 12, as counted circumferentially, are positioned on different pitch circle diameters.

20 Claims, 7 Drawing Sheets

SETTABLE PLUNGING UNIT

TECHNICAL FIELD

The present invention relates to a device for a settable plunging unit, and more particularly concerns a torque transmitting axial plunging unit for a vehicle driveline.

BACKGROUND OF THE INVENTION

One type of axial plunging unit for transmitting torque in a vehicle driveline includes a profiled sleeve with circumferentially distributed, longitudinally extending first ball grooves, a profiled journal with circumferentially distributed, longitudinally extending second ball grooves and balls which are arranged in pairs of first and second ball grooves in k groups of balls. All of the balls arranged in a pair of first and second ball grooves are referred to as a group. When such plunging units are assembled in large volumes, the tolerances of the profiled sleeves and of the profiled journals are compensated for by using different ball sizes. For this purpose, it is necessary to use ball cages with different balls, with the differences referring to different ball diameters. The ball diameters, however, are identical for any one individual ball cage. The suitable ball cages are selected during manual assembly, with the selection criterion being the plunging force of the unit in the ungreased condition. Although the profiled sleeve and the profiled journal can be produced as dimensionally highly accurate components, the cage selection nonetheless is required during assembly. This is because different degrees of distortion during the heat treatment of the profiled sleeve and the profiled journal. Different degrees of distortion result from the tolerances of semi-finished products, tool-related variations and other changes taking place during the production process.

Even though such variations are very slight within individual batches, it can happen that plunging units have to be assembled and tested with several cages until the required plunging force has been achieved. This leads to delays in assembly.

Thus, there exists a need for an improved settable plunging unit.

SUMMARY OF THE INVENTION

It is an object of the present invention to provide settable plunging units which can be assembled into well-functioning assemblies which have a standard, ball-containing type of cage.

According to a first solution, at least the number of first ball grooves corresponds to m times the number k of the groups of balls. Also, the longitudinal axes of the first, second, etc. to the $m^{th}$ of the first ball grooves are positioned on different outer pitch circle diameters (PCDa). In addition, the number of second ball grooves can correspond to n times the number k of the groups of balls, and the longitudinal axes of the first, second, etc. to the $n^{th}$ of the second ball grooves are positioned on different inner pitch circle diameters (PCDi).

According to a second solution, at least the number of first ball grooves corresponds to m times the number k of the groups of balls and the first, second, etc. to the $m^{th}$ of the first ball grooves comprise different outer track circle diameters (GLDa). Further, the number of the second ball grooves can correspond to n-times the number k of the groups of balls, and the first, second, etc. to the $n^{th}$ of the second ball grooves can comprise different inner track circle diameters (GLDi).

Herein m represents the number of different types of first ball grooves and n represents the number of different types of second ball grooves, with k being the number of uniformly circumferentially distributed groups of balls.

The present invention makes it possible to introduce the ball cage in m different positions into the profiled sleeve, and in each position, a different play value occurs with a predetermined ball journal. In the above-mentioned further solution, it is additionally possible to introduce the profiled journal in n different positions into the cage, and in this case, too, a different play value is generated relative to the already predetermined configuration of balls and tracks in the profiled sleeve. The total number of different ball play values in the pairs of tracks is calculated by mxn. Whereas m, due to the relatively large sleeve diameter, depending on the number of groups of balls in the cage, normally ranges between 2 and 3, it can be assumed that n, as a rule, is no greater than 2. In particular, this applies if as high a number as possible, i.e. at least three, but preferably four, groups of balls are used. If this number is reduced to only two groups of balls, n, too, can have a value of 3.

The positions in which the components are associated with one another in the direction of rotation can be indicated by markings applied to the components during the production of the ball grooves. The ball grooves can be designed in such a way that, when the cage is rotated in a certain direction, the plunging force can be changed in a predetermined manner.

The cages are filled with several circumferentially distributed groups of balls arranged in rows. The number of balls in each group and their greatest distance from one another are related to the tilting play between the profiled sleeve and the profiled journal. When changing the plunging force, the tilting play changes slightly at the same time.

Preferred embodiments are illustrated in the drawings and will be described below. Other advantages and features of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

Figure 1:
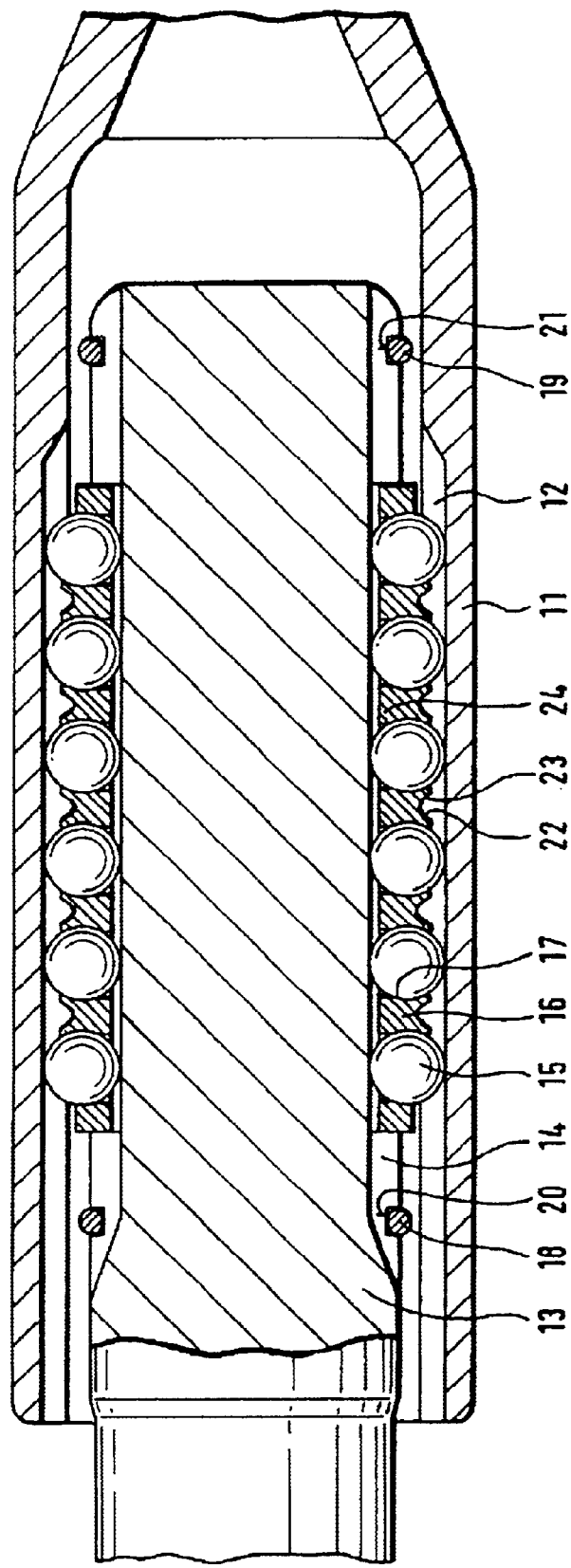
FIG. 1 shows a longitudinal section through a plunging unit according to the present invention.

FIG. 1 shows an axial plunging unit in accordance with the present invention, including a profiled sleeve 11 with longitudinally extending first ball grooves 12 into which there is inserted a profiled journal 13 with longitudinally extending second ball grooves 14. Each pair first and second ball grooves 12, 14 contains groups of six balls 15 which, while being arranged identically within the groups, are each held by a cage 16 in windows 17. On its outside, between the windows, the thin-walled cylindrical cage 16 includes outer cams 22, 23 which engage the first ball grooves 12, and on its inside, between the windows and adjoining the outer cams, if viewed in a cross-section, the cage 16 comprises semi-cylindrical inner cams 24 which engage the second ball grooves 14. At their end faces pointing towards the windows, the cams are ball-cup-shaped in such a way that the balls are thereby held in the windows. The axial plunging distance of the cage and, thus, of the balls, is delimited by securing rings 18, 19 which are inserted into circumferential grooves 20, 21 at the ends of the second ball grooves 14 in the profiled journal 13.

Figure 2:
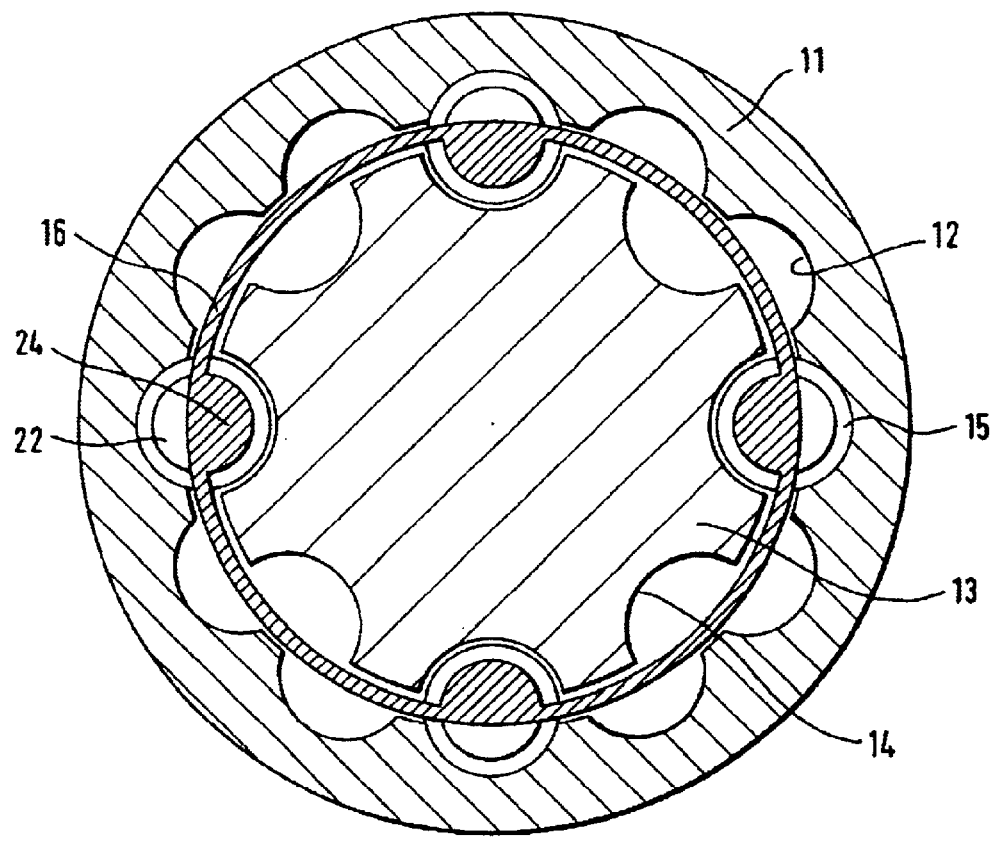
FIG. 2 shows a cross-section of the plunging unit according to FIG. 1.

FIG. 2 shows the above-described assembly in a cross-sectional view, and it can be seen that the profiled sleeve 11 includes a number of (twelve) uniformly distributed first ball grooves 12 and that the profiled journal 13 comprises a number of (eight) uniformly circumferentially distributed second ball grooves 14, with four groups of balls 15 being inserted into pairs of first and second ball grooves. The cage 16 is a thin-walled resilient element which is sectioned between two windows, with outer cams 22 being shown in a plan view and inner cams 24 in a cross-section.

Figure 3:
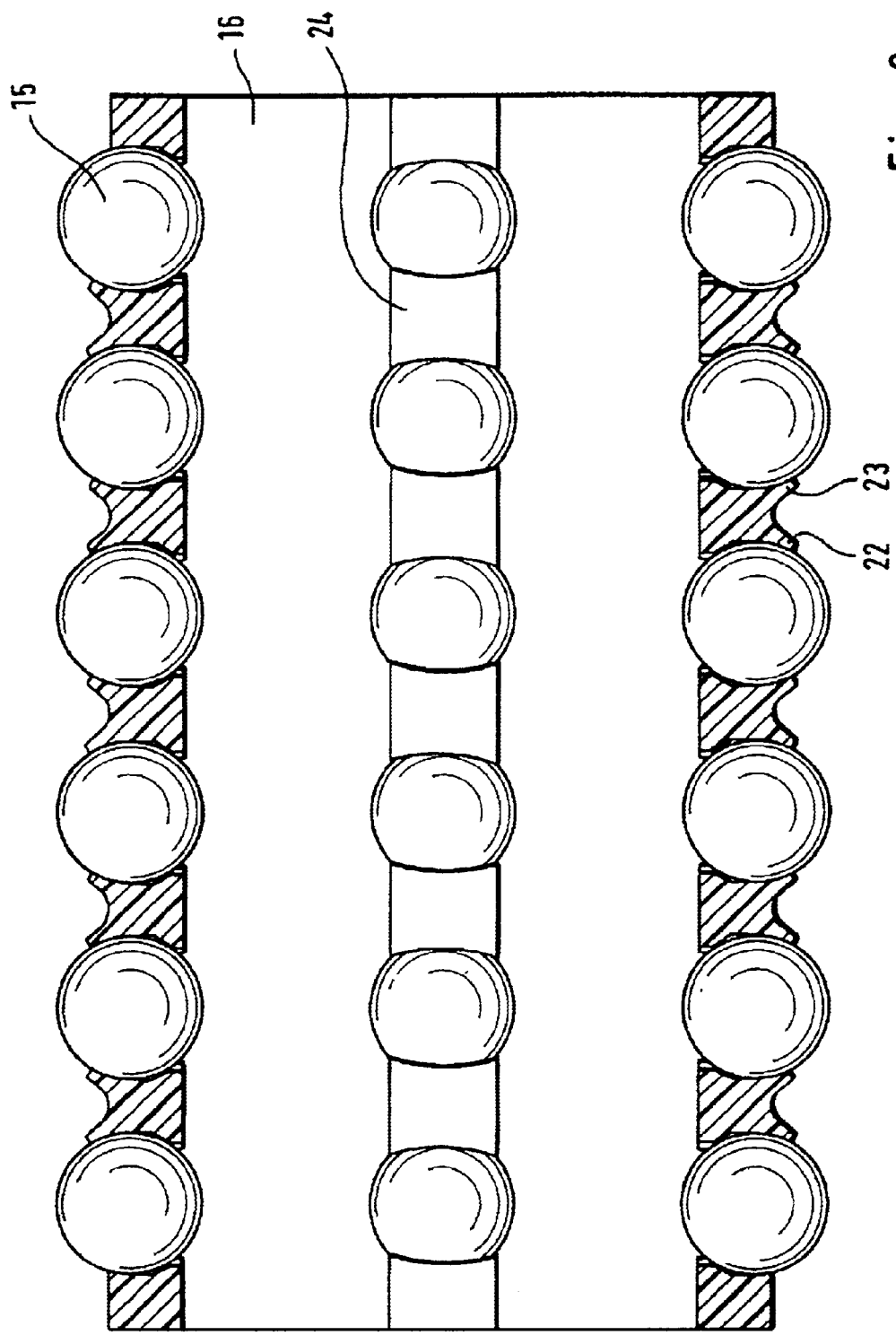
FIG. 3 is a longitudinal section through the cage with balls according to FIG. 1 in the form of a detail.

FIG. 3 shows the cage in a longitudinal section as a detail with the balls 15 inserted. FIG. 3 also shows the ball-cup-shaped design of the faces of the outer cams 22, 23 and of the inner cams 24, which faces point towards the cage window 17 and in which the balls 15 are held in a low-friction way with double annular contact, so that they cannot fall out.

Figure 4:
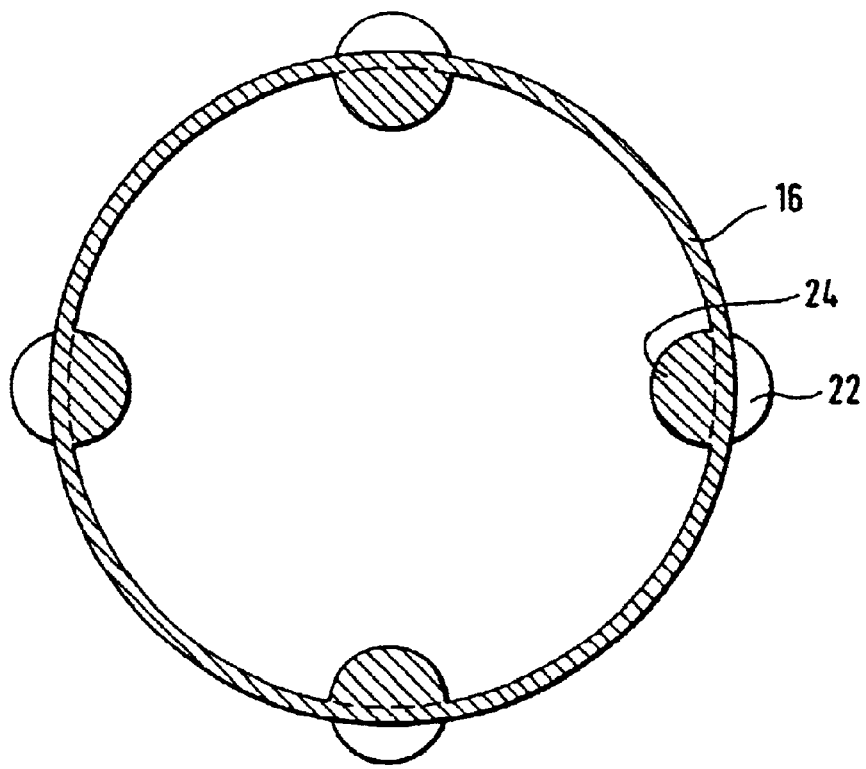
FIG. 4 is a cross-section through the cage with balls according to FIG. 1.

FIG. 4 shows the cage 16 without the balls inserted, as a detail in a cross-sectional view. The number of rows of windows corresponds to the number of groups of insertable balls which, in this example, is number four. These are identifiable by the position of the outer cams 22 and of the inner cams 24.

Figure 5:
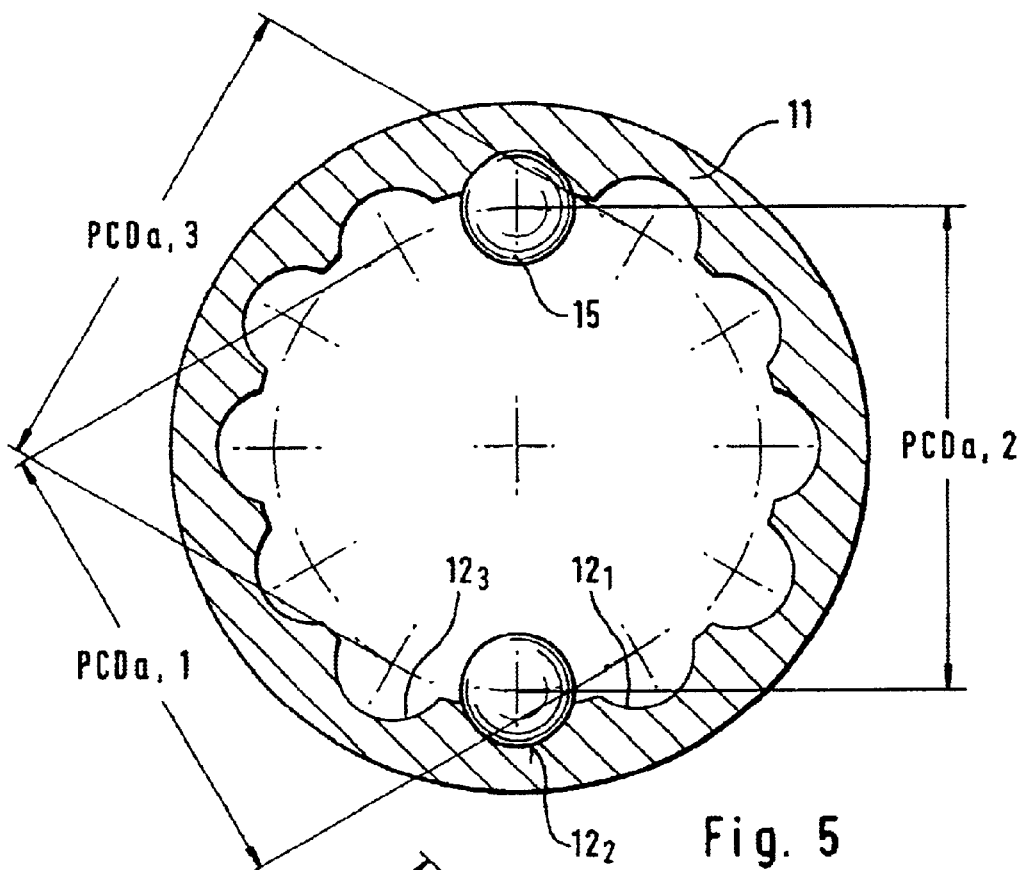
FIG. 5 shows a cross-section through a profiled sleeve according to a first embodiment of the invention with two balls in the form of a detail.

FIG. 5 shows the profiled sleeve 11 with first ball grooves $12_1$ of a first type, first ball grooves $12_2$ of a second type and first ball grooves $12_3$ of a third type. Thus, the number of first ball grooves m, is equal to three (m=3). Each of the types of ball grooves is present four times, so that a total of twelve ball grooves is distributed across the circumference. The track circle diameters and the cross-sectional track shapes of all ball grooves are identical relative to one another, but the generating center lines of the first ball grooves of the first type are positioned on a first pitch circle diameter (PCDa,1), the generating center lines of the first ball grooves of the second type are positioned on a second greater pitch circle diameter (PCDa,2), and the generating center lines of the first ball grooves of the third type are positioned on a third greater pitch circle diameter (PCDa,3). The assembly consisting of the cage and four groups of balls (k=4) as shown in FIG. 3 above can thus be introduced into the profiled sleeve 11 in twelve different angular positions, with all groups of balls 15, in each position, running in ball grooves 12 with a common pitch circle diameter. However, because of the periodic repetition of ball grooves with identical pitch circle diameters, there are achieved only three different effective ball play values.

Figure 6:
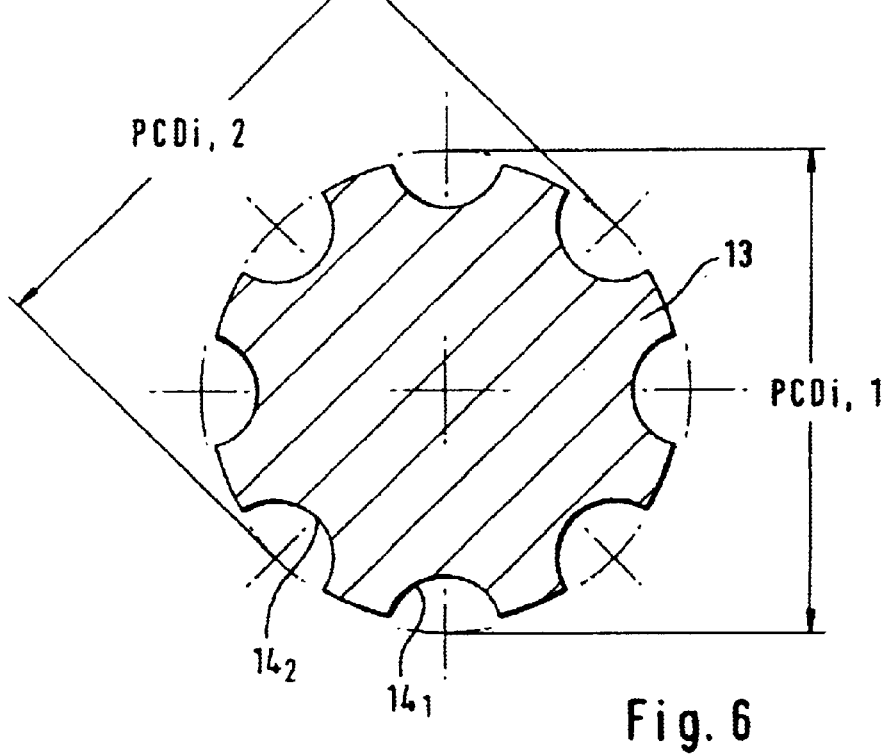
FIG. 6 shows a cross-section through a profiled journal according to a first embodiment of the invention in the form of a detail.

FIG. 6 shows a profiled journal 13 with second ball grooves $14_1$ of a first type and second ball grooves $14_2$ of a second type. Thus, the number of second ball grooves n, is equal to two (n=2). Each of the types of ball grooves is present four times, so that there is provided a total of eight circumferentially distributed ball grooves. The track circle diameters and cross-sectional track shapes of the tracks of all ball grooves are identical relative to one another, but the generating center lines of the second ball grooves $14_1$ of the first type are positioned on a first pitch circle diameter (PCDi,1) and the generating center lines of the second ball grooves $14_2$ of the second type are positioned on a second greater pitch circle diameter (PCDi,2). Therefore, the assembly consisting of the cage and four groups of balls (k=4) as shown in FIG. 3 above can be slid on to the profiled journal in eight different angular positions, with all groups of balls, in each position, running in ball grooves with a common pitch circle diameter. However, because of the periodic repetition of the ball grooves with identical pitch circle diameters, there are achieved only two different effective ball play values.

If the profiled journal of FIG. 6 having two different ball play values is combined with the three different possible ball play values according to FIG. 5, it is possible to set six different resulting ball play values for the complete plunging assembly.

Figure 7:
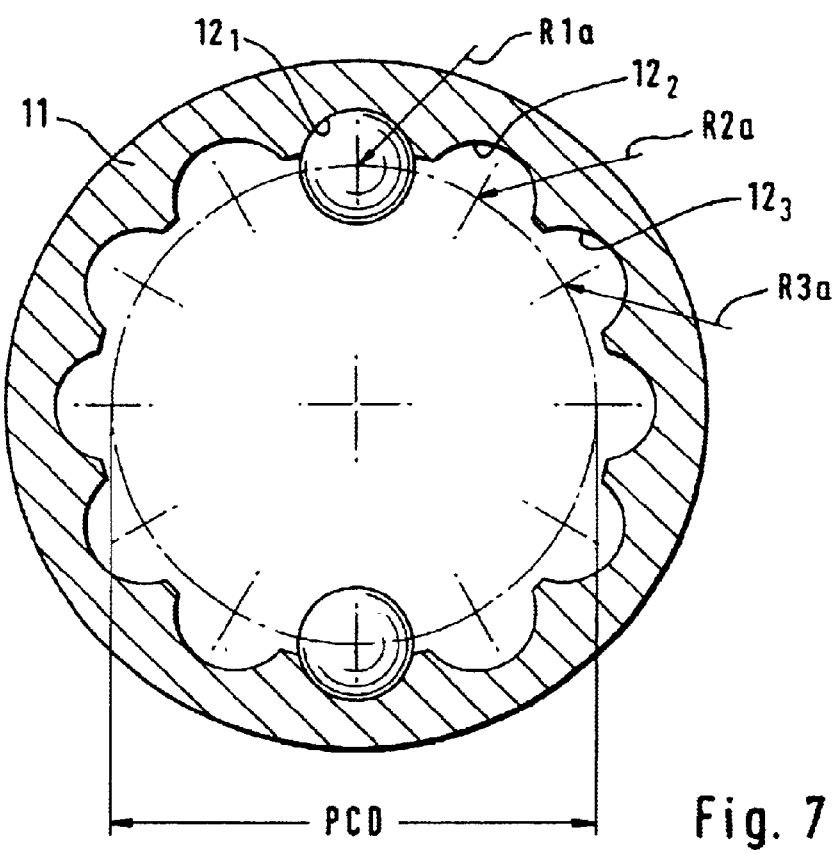
FIG. 7 shows a cross-section through a profiled sleeve according to a second embodiment of the invention with two balls in the form of a detail.

FIG. 7 shows a profiled sleeve 11 according to a second embodiment with first ball grooves $12_1$ of a first type, first ball grooves $12_2$ of a second type and first ball grooves $12_3$ of a third type (m=3). Each of the types of ball grooves is present four times, so that there is provided a total of twelve circumferentially distributed ball grooves. The center lines of all ball grooves are positioned on the same pitch circle diameter PCD, but the first ball grooves of the first type have a first track circle radius (R1a), the first ball grooves of the second type have a second track circle radius (R2a) and the first ball grooves of the third type have a third track circle radius (R3a). The assembly consisting of the cage and four groups of balls (k=4) as illustrated in FIG. 3 above can thus be introduced into the profiled sleeve 11 in twelve different angular positions, with all groups of balls 15, in each position, running in ball grooves with a common track circle radius. However, because of the periodic repetition of ball grooves with identical track circle radii, there are obtained only three different effective ball play values.

Figure 8:
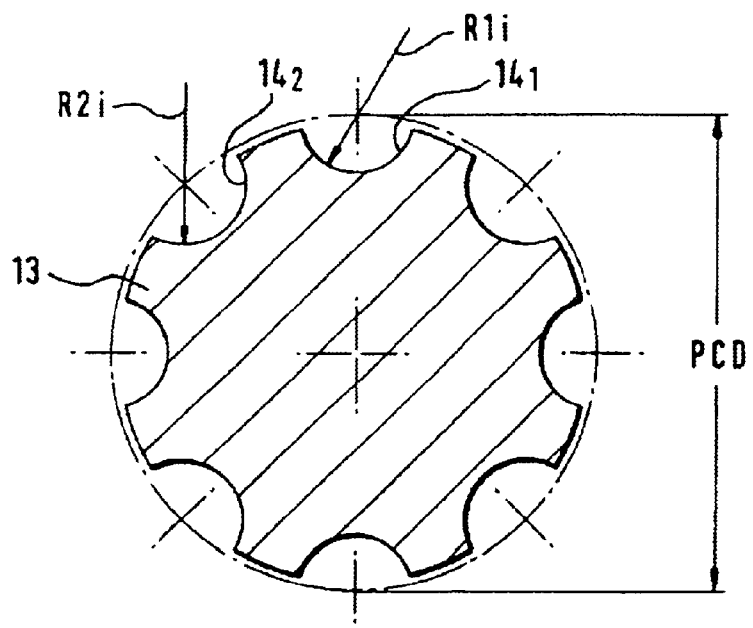
FIG. 8 shows a cross-section through a profiled journal according to a second embodiment of the invention in the form of a detail.

FIG. 8 shows a profiled journal 13 with second ball grooves $14_1$ of a first type and second ball grooves $14_2$ of a second type (n=2). Each of the types of ball grooves is present four times, so that there is provided a total of eight circumferentially distributed ball grooves. The pitch circle diameter PCD on which the generating center lines of the ball grooves are positioned is the same for all ball grooves, but the first track circle radii (R1i) of the second ball grooves of the first type and the second track circle radii (R2i) of the second ball grooves of the second type differ from one another. The assembly consisting of the cage and four groups of balls (k=4) shown in FIG. 3 above can thus be slid on to the profiled journal in eight different angular positions, with all groups of balls, in each position, running in ball grooves 14 with a common track circle radius. However, because of the periodic repetition of the ball grooves with identical track circle radii, there are obtained only two different effective ball play values.

If the two different ball play values according to FIG. 8 are combined with the three different possible ball play values according to FIG. 7, it is possible to set six different resulting ball play values for the complete plunging assembly.

FIG. 9 shows two different embodiments of the unit in accordance with the present invention.

Figure 9A:
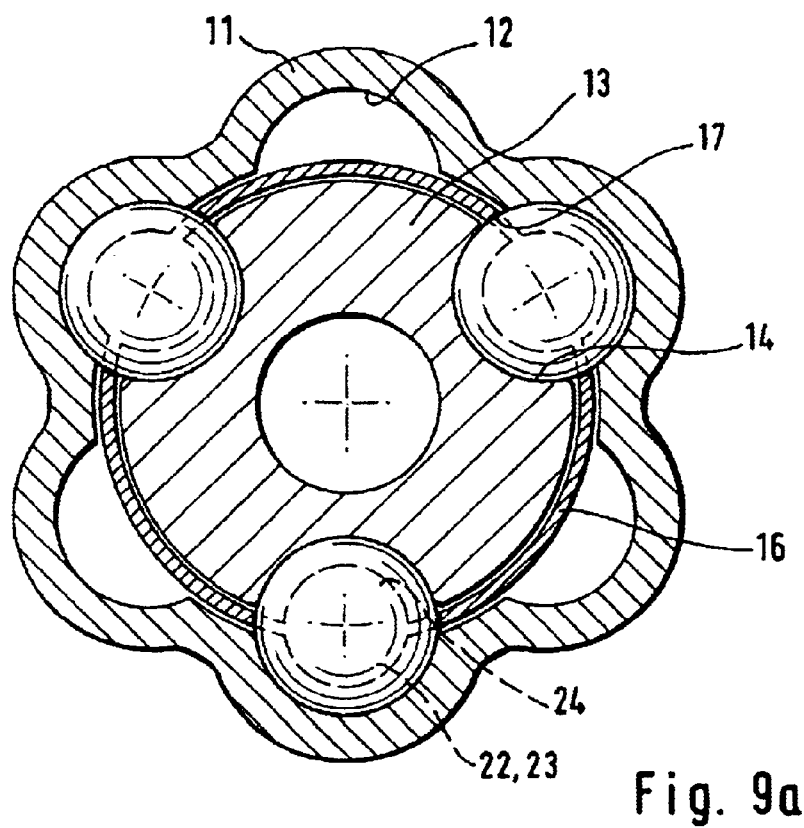
FIG. 9 shows examples of inventive assemblies in the form of cross-sections detailing:
a) a unit in accordance with the invention with three groups of balls in six first ball grooves and three second ball grooves,
b) a plunging unit in accordance with the invention with two groups of balls in six first ball grooves and two second ball grooves.
Figure 9B:
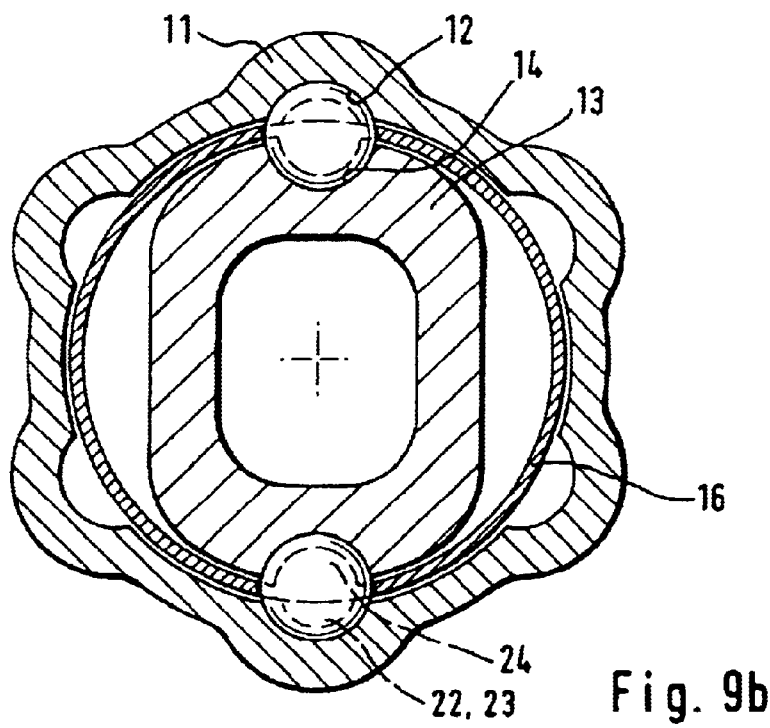

In both embodiments, it is possible to see the profiled sleeve 11 with first ball grooves 12, the profiled journal 13 with second ball grooves 14, balls 15, a ball cage 16 and windows 17; it is also possible to see the contours of the outer cams 22, 23 and of the inner cams 24. In both embodiments, the profiled sleeve 11 is shown as a formed part with an approximately constant wall thickness. In the embodiment of FIG. 9a, the profiled journal is a round hollow journal, whereas in the embodiment of FIG. 9b the profiled journal is shown as a flattened hollow journal. Otherwise, the Figures differ in the following respects: in FIG. 9a, the complete plunging assembly comprises six first ball grooves and three second ball groves whereas in FIG. 9b, six first ball grooves and two second ball grooves are combined in the plunging assembly.

From the foregoing, it can be seen that there has been brought to the art a new and improved settable plunging unit. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. An axial plunging unit for transmitting torque within a driveline, comprising:
a profiled sleeve (11) with circumferentially distributed, longitudinally extending first ball grooves (12), a profiled journal (13) with circumferentially distributed, longitudinally extending second ball grooves (14), balls (15) which are arranged in pairs of the first and second ball grooves (12, 14) in k groups of balls, wherein the number of first ball grooves (12) corresponds to at least m times the number k of the groups of balls, wherein longitudinal axes of the first through $m^{th}$ first ball grooves (12), as referenced circumferentially, are positioned on different outer pitch circle diameters (PCDa), and wherein (m−1)k first ball grooves are free of balls, and all groups of balls are held in a cage (16) in a fixed position with respect to one another.

2. A unit according to claim 1, wherein the number of second ball grooves (14) corresponds to n times the number k of the groups of balls, wherein longitudinal axes of the first through $n^{th}$ second ball grooves (12), as referenced circumferentially, are positioned on different inner pitch circle diameters (PCDi), and wherein, (n−1)k second ball grooves are free of balls.

3. An axial plunging unit for transmitting torque within a driveline, comprising:
a profiled sleeve (11) with circumferentially distributed, longitudinally extending first ball grooves (12);
a profiled journal (13) with circumferentially distributed, longitudinally extending second ball grooves (14);
balls (15) which are arranged in pairs of first and second ball grooves (12, 14) in k groups of balls, wherein the number of first ball grooves (11) corresponds to at least m times the number k of the groups of balls, wherein longitudinal axes of the first through $m^{th}$ first ball grooves (12), as referenced circumferentially, comprise different outer track circle radii (Ra), and wherein (m−1)k first ball grooves are free of balls, and all groups of balls are held in a cage (16) in a fixed position with respect to one another.

4. A unit according to claim 3, wherein the number of second ball grooves (12) corresponds to n times the number k of the groups of balls, wherein the first through $n^{th}$ second ball grooves (12), as referenced circumferentlally, comprise different inner track circle radii (Ri), and wherein, (n−1)k second ball grooves are free of balls.

5. A unit according to claim 1, wherein m equals 2 to 6.

6. A unit according to claim 3 wherein m equals 2 to 6.

7. A unit according to claim 2, wherein n=2.

8. A unit according to claim 4, wherein n=2.

9. A unit according to claim 1, wherein track cross-section radii (Ra, Ri) of all the first ball grooves (11) are identical relative to one another and all of the second ball grooves (12) are identical relative to one another.

10. A unit according to claim 3, wherein the pitch circle diameters (PCD) of all the first ball grooves (11) are identical relative to one another and all of the second ball grooves (12) are identical relative to one another, with reference to their respective center lines.

11. A unit according to claim 1, wherein the groups of balls (15) are held in the cage (16) so as to be uniformly circumferentially distributed relative to one another.

12. A unit according to claim 3, wherein the groups of balls (15) are held in the cage (16) so as to be uniformly circumferentially distributed relative to one another.

13. A unit according to claim 11, wherein the balls (15) in all groups of balls are held by the cage (16) so as to be equally distributed in the longitudinal direction.

14. A unit according to claim 12, wherein the balls (15) in all groups of balls are held by the cage (16) so as to be equally distributed in the longitudinal direction.

15. A unit according to claim 1, wherein all of the balls (15) are of identical size relative to one another.

16. A unit according to claim 3, wherein all of the balls (15) are of identical size relative to one another.

17. A unit according to claim 11, wherein all of the balls (15) engage windows (17) of the cage (16) captively.

18. A unit according to claim 12, wherein all of the balls (15) engage windows (17) of the cage (16) captively.

19. A unit according to claim 13, wherein all of the balls (15) engage windows (17) of the cage (16) captively.

20. A unit according to claim 14, wherein all of the balls (15) engage windows (17) of the cage (16) captively.

* * * * *